United States Patent [19]
Frank

[11] Patent Number: 5,991,505
[45] Date of Patent: Nov. 23, 1999

[54] SWITCHING MOTOR CONTROL APPARATUS

[76] Inventor: Steven R. Frank, 11192 Twin Spruce Rd., Golden, Colo. 80403

[21] Appl. No.: 08/985,035

[22] Filed: Dec. 4, 1997

Related U.S. Application Data

[60] Provisional application No. 60/032,937, Dec. 9, 1996.

[51] Int. Cl.[6] ............................................. H02P 7/29
[52] U.S. Cl. ...................... 388/828; 388/829; 388/907.5; 388/934
[58] Field of Search .................... 388/809, 811, 388/828, 829, 842, 844, 848, 853, 903, 907.2, 909, 934, 907.5; 318/569, 600, 601, 603, 632, 684, 254, 268–271, 439, 471, 472

[56] References Cited

U.S. PATENT DOCUMENTS

| | | | |
|---|---|---|---|
| 4,301,396 | 11/1981 | Bourke | 318/490 |
| 4,611,155 | 9/1986 | Kurakake | 318/603 |
| 4,630,210 | 12/1986 | Salazar et al. . | |
| 4,686,437 | 8/1987 | Langley et al. | 318/254 |
| 4,833,375 | 5/1989 | Del Signore, II . | |
| 5,045,988 | 9/1991 | Gritter et al. | 318/803 X |
| 5,350,988 | 9/1994 | Le | 318/618 |
| 5,510,687 | 4/1996 | Ursworth et al. | 318/727 |
| 5,574,346 | 11/1996 | Chavan et al. . | |
| 5,760,563 | 6/1998 | Bennett et al. | 318/641 |
| 5,764,024 | 6/1998 | Wilson | 318/805 |

*Primary Examiner*—Bentsu Ro
*Attorney, Agent, or Firm*—Emery L. Tracy

[57] ABSTRACT

A motor control apparatus for controlling a motor is provided. The motor has an output power stage and a relay allowing power to be connected to the output power stage. The apparatus comprises a microprocessor providing a PWM cycle delivered through a capacitor to a transistor. The microprocessor activates the transistor for a first predetermined amount of time during the PWM cycle causing the relay to actuate the output power stage thereby driving the motor. A detection mechanism within the microprocessor for detecting a fault in the main output transistor. The circuitry disengages the relay from the output power stage thereby causing the motor to cease being driven.

10 Claims, 4 Drawing Sheets

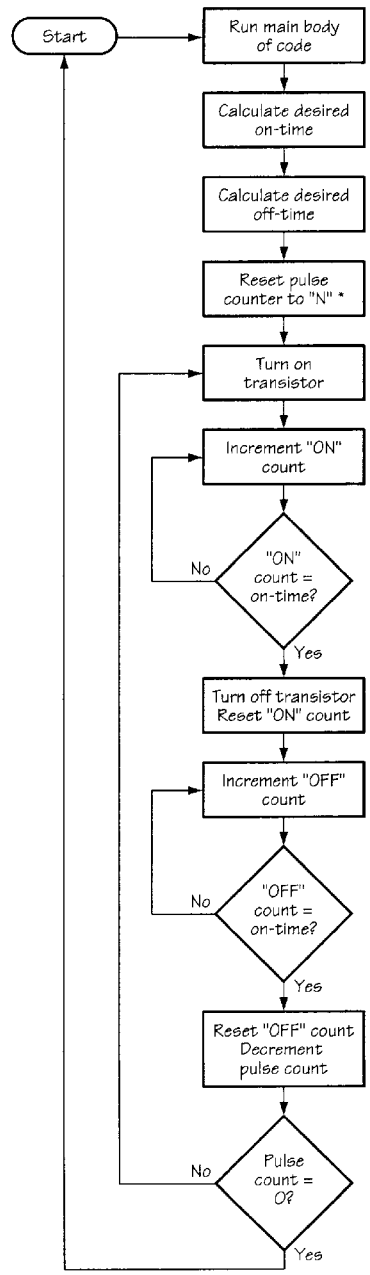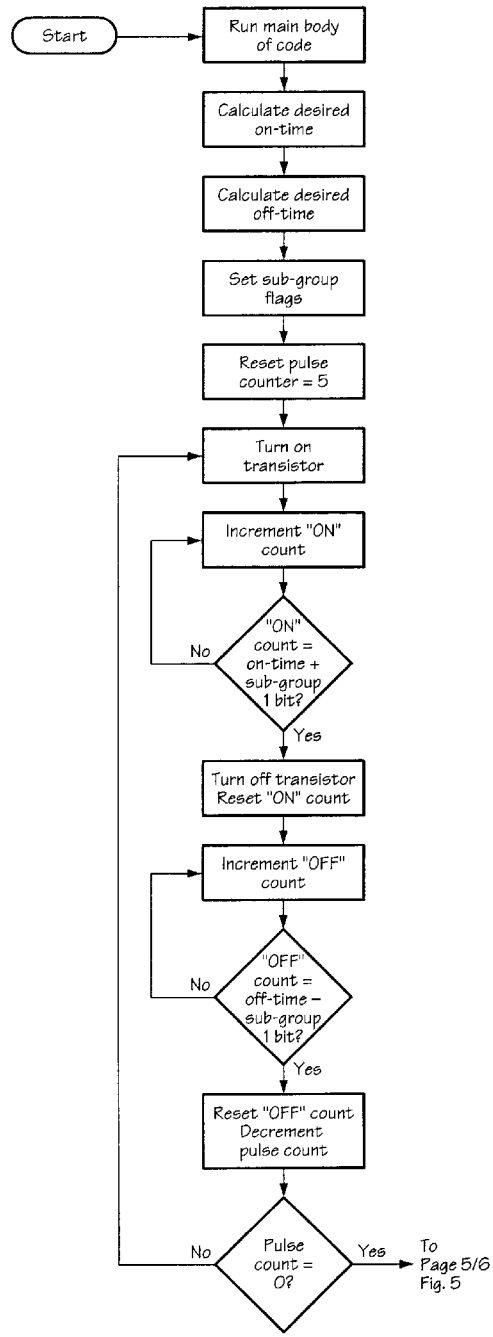

Fig. 5
High Resolution Mode (sub-group 2 pulser)
Fig. 6
High Resolution Mode (sub-group 3 pulser)
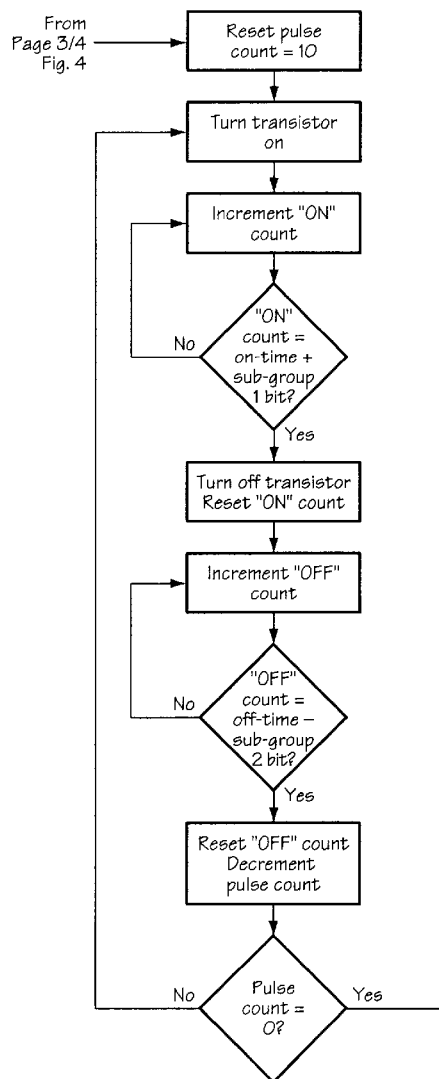
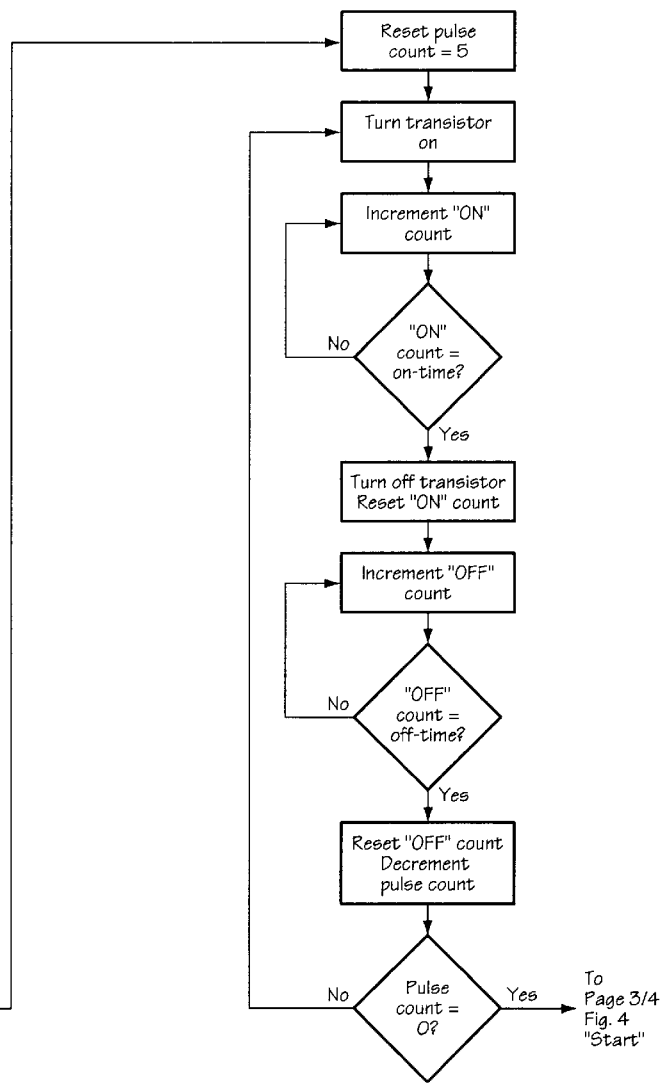

SWITCHING MOTOR CONTROL APPARATUS

The present application is a continuation-in-part of pending provisional patent application Ser. No. 60/032,937, filed on Dec. 9, 1996.

BACKGROUND OF THE INVENTION

1. Field of the Invention

This invention relates generally to a switching motor control and, more particularly, it relates to a switching motor control for a D.C. motor utilizing a microcontroller to replace at least a portion of the analog circuitry in the motor control.

2. Description of the Prior Art

The availability of faster and more proficient semiconductors having higher voltage capabilities have guided designers away from using step-down transformers in power supplies in order to reduce the cost and size for D.C. motor controls. More motor controls are being designed to operate off-line, i.e., the motor controls immediately rectify and filter the 120 volt AC line and produce a 170 volt DC rail.

In the prior art, the pulse width modulation (PWM) circuitry utilized in the motor-controllers has required op-amps, comparator, and delay circuits to generate the error voltages of the control loops and the PWM waveforms to drive the power stage. Still, more op-amps are used to generate the I.R. (internal resistance) compensation which is so common in D.C. motor control. Achieving noise rejection to protect control signals from the transients generated by the switching transistors has been difficult and has required more components and op-amps in the form of synchronous and integrating filters.

With off-line switching motor controls, it is not unusual to drive a 120 volt DC motor. Since the power supply can be 170 volt DC with a typical line of 120 volt AC, the maximum torque that the motor could deliver to the load is quite high. The user input to these motor controls is typically in the form of a DC voltage from a potentiometer or a D/A converter. If this voltage is corrupted and becomes inappropriately high, the motor can seriously damage the load and the user. Corrupted voltage can occur in a number of different ways ranging from loss of continuity to the input signal to a total failure of the output power handling device.

The output power handling stage of the prior art motor controllers is typically a single transistor and a free-wheeling diode. This combination provides PWM at a very low cost and high efficiency. If, however, the power transistor should become shorted (not an unusual failure mode) when the power is applied, the full 170 volt DC supply would be applied across the motor and the motor will accelerate at a phenomenal rate. Such acceleration could be very dangerous and potentially damaging to the load and the operator.

Over-temperature protection has previously required the addition of a temperature measuring device in the form of circuitry to buffer the signal and circuitry to cause the protection. The addition of a temperature measuring device adds cost, complexity, and parts to the motor controllers.

The switching motor control of the present invention solves many of the common motor control problems in the prior art by the implementation of a small-inexpensive microcontroller which consolidates most of the functionality which were previously to be accomplished in discrete circuitry.

SUMMARY OF THE INVENTION

The present invention is a motor control apparatus for controlling a motor. The motor has an output power stage and a relay allowing power to be connected to the output power stage.

The apparatus of the present invention comprises means for controlling a D.C. motor which utilizes a common, inexpensive microcontroller to perform the functions which have traditionally required a great deal of analog circuitry. These functions which are replaced by the microcontroller and were traditionally performed in hardware include:

a) generating the PWM in software obviating the need for a ramp-generator circuit and a comparator circuit;

b) forming the control loop summations and gains in software replaces many discrete resistor, capacitors, and op-amp circuits which are traditionally used to implement an analog control loop;

c) performing the I.R. compensation in software replaces even more discrete resistors, capacitors, and op-amp circuits;

d) controlling acceleration and deceleration by software which replaces a hardware solution which requires op-amps, resistors, and capacitors;

e) inferring temperature and protecting the motor obviating the need for a temperature sensor, required buffering circuitry, and the circuitry necessary to implement a "fold-back" function;

f) synchronously detecting the current waveform with the microprocessor at a point in time where the value will be valid and noise free thereby improving system performance and requiring no heavy filtering that most analog systems require. By using the microprocessor to synchronously detect the user input waveform at a point in time when the power pulsing is not occurring allows the signal to be processed without the need for filtering of noise. This is simply due to the fact that the main source of system noise is the power pulsing and when the signal is converted for use at a period in time where the microprocessor has the power pulsing turned off, there is no noise introduced on the signal.

The apparatus of the present invention also comprises a microprocessor providing a PWM cycle delivered through a capacitor to a transistor. The microprocessor activates the transistor for a first predetermined amount of time during the PWM cycle causing the relay to actuate the output power stage thereby driving the motor. Detection means are provided in hardware via U1:C for detecting a fault in the main power transistor Q1. The transistor Q2 disengages the relay from the output power stage thereby causing the motor to cease being driven when a fault has been detected.

Additionally, the present invention is a motor control system for controlling a motor. The motor has internal resistive losses of voltage during operation of the motor. The system comprises a microcontroller with the microcontroller comprising a monitoring and detecting means for monitoring the current of the motor and detecting internal resistive losses of voltage of the motor and means for adding a proportion amount of pulse width to the motor current upon detection of internal resistive losses of current by the monitoring and detecting means.

In an embodiment of the present invention, the monitoring and detecting means utilizes a comparator based A/D.

Furthermore, the present invention is a motor control device for controlling a motor. The motor receives electrical input from a power source. The device comprises a first resistor pulling the electrical input to ground upon disconnection of the potentiometer from the controller and second and third resistors to allow detection of any fault in the input potentiometer.

BRIEF DESCRIPTION OF THE DRAWINGS

FIG. 2a is a PWM waveform diagram illustrating pulse groups of twenty (20) pulses repeated between executions of the main body of the code of the switching motor control apparatus of the present invention;

FIG. 2b is a PWM waveform diagram illustrating the twenty (20) cycles pulse groups of PWM divided into three sub-groups comprising a first sub-group of five (5) pulses, a second sub-group of ten (10) pulses, and a third sub-group of five (5) pulses of the switching motor control apparatus of the present invention;

FIG. 3 is a flowchart illustrating the PWM generation in the software of the switching motor control apparatus of the present invention;

FIG. 4 is a flowchart illustrating the PWM generation in the software of the first sub-group of five (5) pulses of the switching motor control apparatus of the present invention;

FIG. 5 is a flowchart illustrating the PWM generation in the software of the second sub-group of ten (10) pulses of the switching motor control apparatus of the present invention; and FIG. 6 is a flowchart illustrating the PWM generation in the software of the third sub-group of five (5) pulses of the switching motor control apparatus of the present invention.

DETAILED DESCRIPTION OF THE PREFERRED EMBODIMENTS

Figure 1:
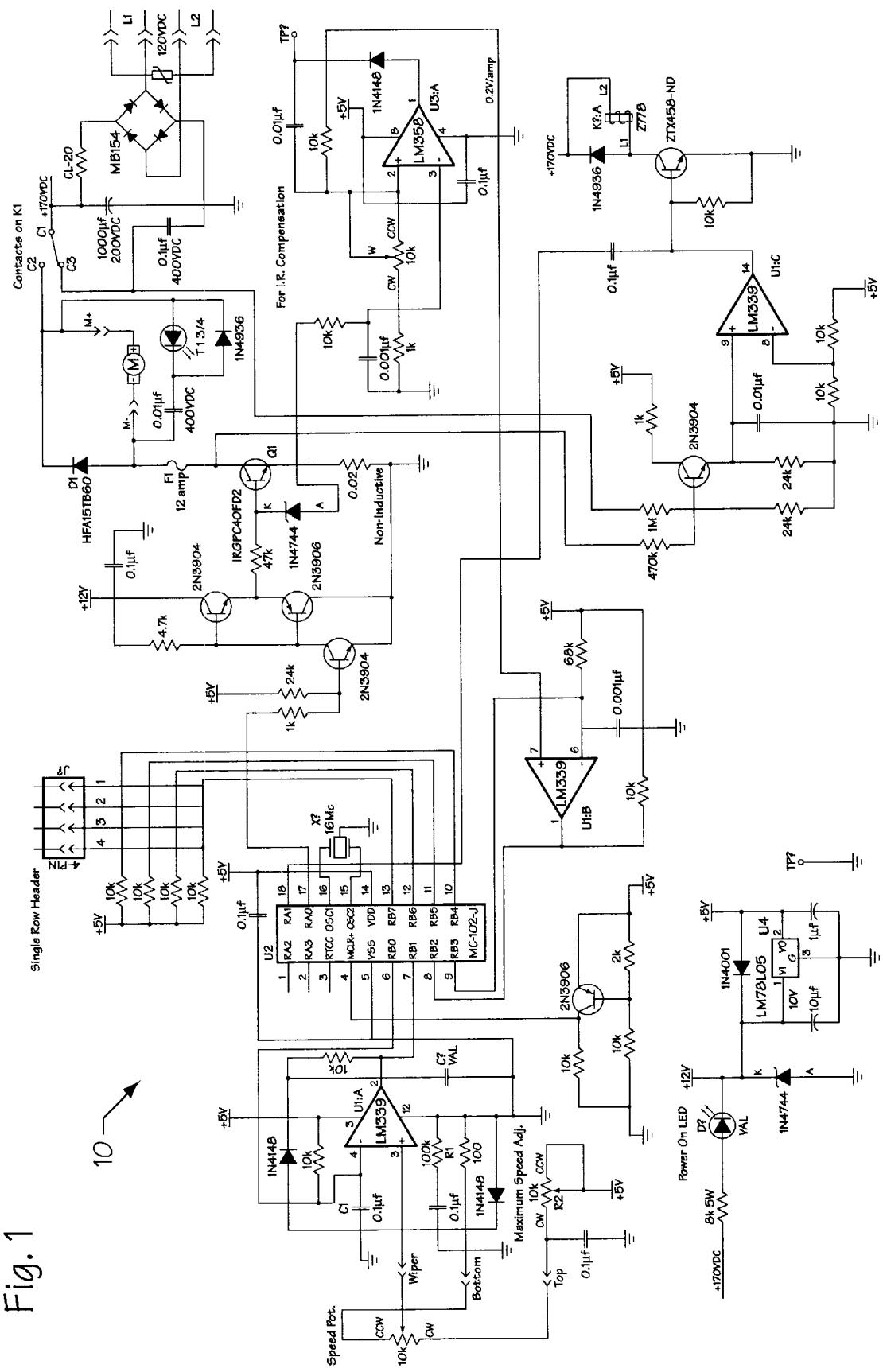
FIG. 1 is a circuit diagram illustrating an switching motor control apparatus constructed in accordance with the present invention.

As illustrated in FIG. 1, the present invention is an switching motor control architecture, indicated generally at 10, which takes advantage of an inexpensive microcontroller to reduce the number of component, cost, and board size of the motor control. The motor control architecture 10 of the present invention also provides innovative safety features protecting the user and system from failures that are considered catastrophic in currently available prior art motor controls. Many features which are currently embodied in hardware of prior art motor controls are incorporated into the microcontroller software of the present invention, in addition to novel features.

The motor control 10 of the present invention, as described heretofore and hereafter, can be used in a variety of applications. The motor control 10 can be used in ambulatory assist devices such as wheelchairs and scooters. The motor control 10 can also be used in industrial equipment for material handling and transport vehicles. Furthermore, the motor control 10 are usable in electronic appliances such as exercise machines and treadmills.

In operation, the motor control 10 of the present invention accepts the desired input from the user such as speed or torque from an input potentiometer sometimes referred to as a "throttle pot". The motor control 10 is operatable from batteries or from line distribution rectified A.C. power.

The motor controlled by the motor control 10 of the present invention is referred to as permanent magnet direct current (PMDC). The PMDC motors are internally commutated and require only direct current of the appropriate polarity to operate. The motors range in size from a fractional horsepower to many horsepower and from approximately six (6) volts to approximately one-hundred and seventy (170) volts. The motor is connected to the motor control 10 by a pair of wires which attach internally to the armature windings of the motor.

User Input:

The microcontroller integrated circuit of the present invention receives the user requested input, i.e., speed or torque, through an analog to digital converter (A/D) comprised of Comparator U1:A and a few discrete components, i.e., diodes, resistors, and capacitors surrounding U1:A. The circuit operates by maintaining the capacitor C1 discharged until the circuit determines to measure the user requested input. The measurement is synchronized with the other functionality of the system such that the switching transistors of the power stage are in the off-state a sufficient length of time to allow the switching transients to subside. By maintaining the switching transistors in the off-state, the possibility of noise disturbing the reading is reduced and the need for a multitude of analog filtering components is obviated.

The capacitor C1 is next allowed to integrate until the capacitor C1 exceeds the value of the user input at the input to the comparator U1:A. At this point, the comparator output changes state. During the time of integration and until the comparator output changes state, the microcontroller is counting at a known rate derived from its internal clock. The count when the comparator has changed state is proportional to the user input. The method of introducing the user input to the microcontroller allows for any analog voltage to be inexpensively converted to digital inside of the microcontroller. Two input pins from the microcontroller can also be used to increment or decrement a value in the microcontroller by user switches through the auxiliary port.

Safety Input Validation:

Resistor R1 pulls the input to ground if a connection from the potentiometer is lost thus bringing the motor to a stop. In a similar manner, the resistor R2 assures that a maximum input voltage which can be provided by the potentiometer is limited to less than the voltage supplied to the potentiometer under proper operating conditions. In this manner, should a loss of continuity between the bottom of the potentiometer and the system ground occur, the voltage will rise to the maximum for the system (5 volt DC) and the microprocessor software will immediately recognize the voltage rise as a fault and stop the motor. Similarly, should the top of the potentiometer loose continuity, the voltage on the wiper will fall to zero and the motor will come to a stop. Stopping the motor is such a fashion represents an important safety feature.

When the motor control is first started (power first applied), the microcontroller determines that if the user input is above a minimal point, the microcontroller will not allow the motor to be pulsed with power until the input is first reduced below this minimal point. In this way, should the motor control be initiated with the user input at full scale, the motor will not "take-off" at full power. A soft-start and soft-stop, i.e., smooth acceleration and smooth deceleration rate, are also implemented in software thus further reducing the circuitry required for the controller.

Output Failure Detect:

When the motor control first receives power, the microprocessor begins code execution. If the microprocessor determines that the input is valid and that all systems are functional, the microprocessor will enable relay 1 allowing the power to be connected to the output power stage. This is accomplished by a PWM signal provided in the code through a capacitor to the transistor which actuates the relay. The relay will then close allowing power to be applied to the power stage. Once the relay has closed, the microcontroller can disengage the power to the motor in a positive way if a fault condition is detected, by discontinuing the drive to the relay actuating transistor. The microprocessor deactivates the PWM signal to the relay transistor Q2 upon detection of a fault in the system.

Since a short in the output transistor will cause the motor to "run-away" at a tremendous speed, it is desirable to detect failure before the motor has an opportunity to run-away. The microcontroller based system of the present invention offers an excellent opportunity to provide this "run-away" protection. With each PWM cycle, there must be an amount of time during which the output transistor is off. This can be determined and set in software, i.e., 5 $\mu$s. A separate watch-dog timing circuit (comprised of U1:C) watches the motor and is reset during each transistor off time. Should a transistor off time not occur within the time-frame of each PWM cycle (100 $\mu$s for a 10 kc PWM system) then the circuit de-energizes a normally open relay and disconnects the power from the motor. The response time of this system is 100 $\mu$s plus the release time of the relay which is usually less than ten (10) ms. Thus, in the event of a run-away motor condition, the motor will be disconnected from power in around ten (10) ms. The actual voltage on the motor is monitored to determine if an off-state of the transistor has occurred. As illustrated in FIG. 1, the signal at the collector of Q1 is used to generate the timing reset to the hardware watch-dog comparator. This protection will greatly reduce the impact of a catastrophic motor controller failure on the load and the operator thereby greatly increasing the safety of the motor driven system.

The relays, which lend themselves well to this type of application, have coil voltages of 12 volt DC and 24 volt DC. This presents a problem as one would waste a great deal of heat and require a large dropping resistor to run the relays from the 170 volt DC line that is commonly used. The relays require too much current to run from the on-board low voltage supply as this would cause the regulators to dissipate the extra heat as well. The solution which the microcontroller based motor control of the present invention offers is an elegant and simple one. Since these drives are never intended to provide 100% output as this would supply 170 volt DC, they typically see output duty-cycles of approximately 75% or less. This means that in each output cycle, there is a guaranteed off time of at least approximately 25%. This can be used through a microcontroller output pin to generate a very low duty-cycle waveform which can be applied to the transistor which actuates the power interrupting relay. In a 170 volt DC system which utilizes a 24 volt DC relay coil, a 14% duty cycle waveform to PWM the coil of the relay will produce the required 24 volt DC on the relay coil. This is a very efficient means of energizing the relay and it requires that the microcontroller be operational before the relay can ever close to provide power to the motor. It takes advantage of guaranteed idle time of the microcontroller and costs very little to add.

Speed Regulation:

Compensation for the internal resistive losses of the motor is common practice in motor controls. In order to compensate for the internal resistive losses, the motor control of the present invention adds an amount to the output voltage proportional to the motor current times the motor impedance by using a comparator based A/D as previously described above to monitor the motor current. The software then adds a proportional amount of pulse width in the microcontroller. By compensating for internal resistive losses in this way, very little additional circuitry is required. The current through the motor can easily synchronously be detected by turning the lower transistor on and waiting for switching transients to subside (typically a few microseconds). Then, the capacitor of the A/D integrating comparator is allowed to begin integrating. When the output from the comparator changes state, the count that has been reached internal to the microcontroller is proportional to the motor current. In this manner, no additional filtering is required of the signal and the current is more accurate than a simple filter comprised of discrete analog components. Previously, an analog filter would integrate the discontinuous current waveform and would contain a significant error based on the waveform due to the speed of the motor operation.

Generating the PWM Waveform:

In the past, the PWM waveform has been generated by comparing the analog error voltage or command voltage (if open loop) to a ramp or triangular wave. By requiring a comparison between the analog error voltage or command voltage to a ramp or triangular wave, a significant amount of circuitry and board space was required. The microcontroller of the motor control 10 of the present invention has the user speed request and information about what is occurring in the circuit (such as the motor voltage or current). The microcontroller can thus produce the command or error signal mathematically and internally. The signal can then be directly translated into a PWM percentage. The PWM percentage is used by the microcontroller to produce the on and off signal to the transistor creating the PWM waveform of the required percentage and desired frequency.

Figure 2:
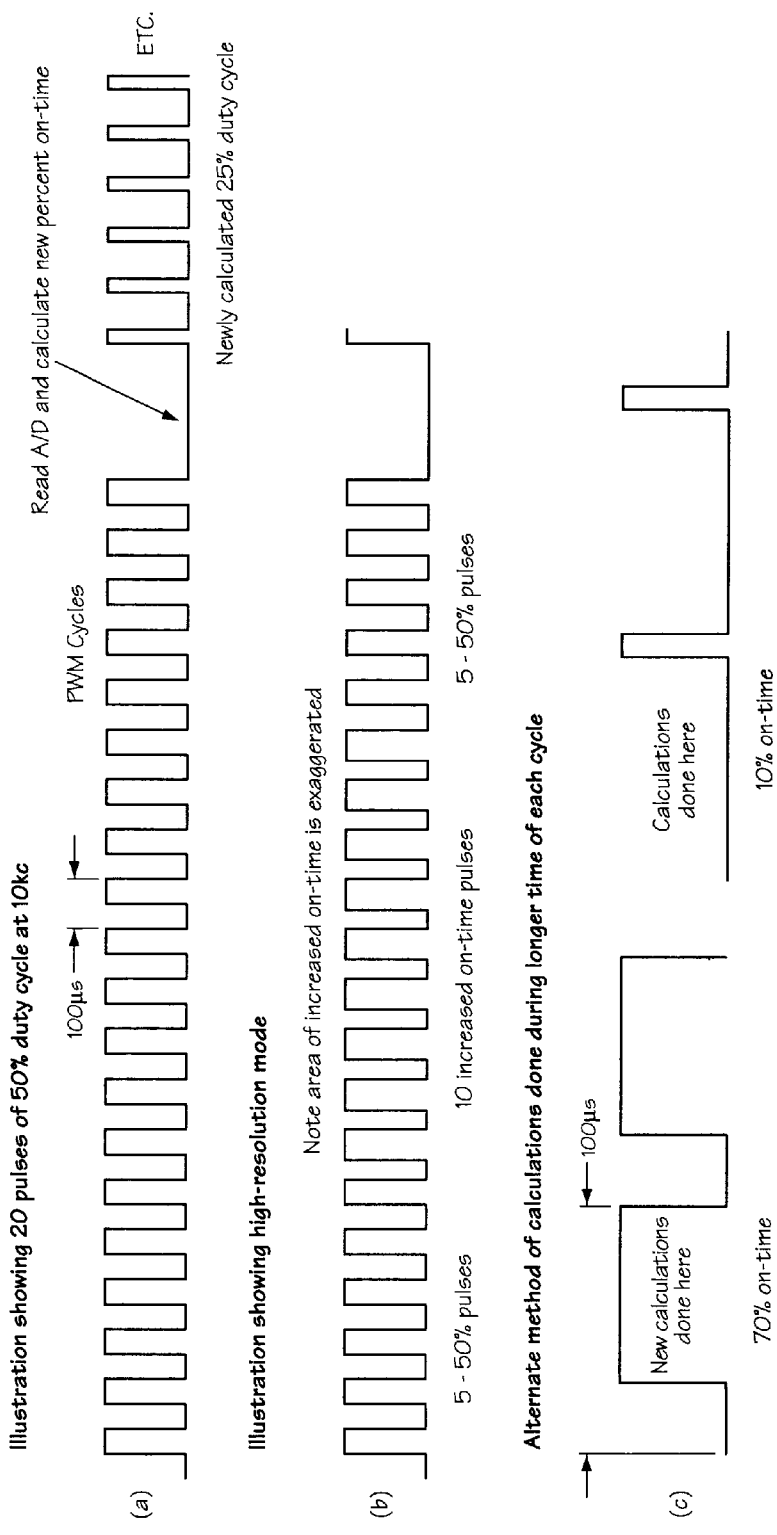
FIG. 2 is a PWM waveform diagram illustrating pulse groups of twenty (20) pulse groups of the switching motor control apparatus constructed in accordance with the present invention.

As illustrated in FIG. 2a, the generation of the waveform of the motor control 10 of the present invention can be handled in a low-cost microcontroller without a dedicated PWM output register in one of two ways. First, the microcontroller of the motor control 10 determines which time is actually going to be longer; either the on-time of the PWM cycle or the off-time of the PWM. During the time which is longer, the calculations of the next required PWM percentage are performed. In the case of a 10 kc system, approximately fifty (50) or more machine cycles (fifty (50) $\mu$s) are available in which to calculate the next percentages before the outputs need to be changed in state.

Second, a still simpler technique is predicated upon the presumption that the user input and the control calculation to assure motor control, need only be performed every X number of PWM cycles. Preferably, the number of PWM cycles is around twenty (20) cycles which amounts to approximately two (2) milliseconds at 10 kc. With every X number of PWM cycles, the microcontroller of the motor control 10 of the present invention measures the desired control parameters and calculates the required PWM percentages. The microcontroller then produces another X cycles of PWM to the active power transistor and stops again to calculate. Since the calculation takes only a short time (less than approximately fifty (50) $\mu$s), the impact of the off time is minimal and only limits the ability of the drive to apply the full available D.C. rail to the motor. The limit is designer controllable by selecting in the software how often the microprocessor stops to re-calculate. The software designer preferably determines the balance of percentage of available supply, system cycle time and performance.

As illustrated in FIG. 2b, additionally, the twenty (20) cycles pulse groups of PWM can be divided into three sub-groups comprising a first sub-group of five (5) pulses, a second sub-group often (10) pulses, and a third sub-group of five (5) pulses. A flag variable at the beginning of each sub-group can either add or not add a bit of on-time to the sub-group. The bit of on-time is preferably used to indicate the higher resolution for the PWM percentage. For instance, if the on-time adds a bit to the first sub-group of five (5) pulses, then the average on-time of the entire twenty (20) pulse group will be increased approximately 25% which is be effectively approximately a ¼ bit increase. If the bit were to be added to the second sub-group of ten (10) pulses, it would increase the twenty (20) pulse group average on-time by approximately 50% which is effectively approximately ½ bit. In this manner, when running from a 8 Mc part at 10 MHz PWM, when one would expect to be limited to approximately a six (6) bit resolution, approximately an eight (8) bit resolution can be achieved.

In the high resolution mode, since each of the pulse sub-groups are repeated often for every execution of the main body of the code, a waveform is presented as best illustrated in FIG. 2a. Using the example of twenty (20) pulses and 10 kc PWM as set forth above, approximately two (2) milliseconds of PWM are followed by a predetermined period of time to run the body of the code. The period of time necessary to run the code body will typically require less than approximately two hundred (200) $\mu$s. Therefore, the maximum "total average" on-time that could be achieved is approximately 90%. Alternatively, the transistor could be left on during the running of the main body of the code and then approximately 100% on-time could be achieved, but the minimum on-time would be approximately 10%. The actual choice of the on-time percentage is generally application specific and is determined by the designer of the motor control 10.

Since approximately three (3) machine cycles are required to check for the termination point of each pulse, the resolution of the PWM percentage is determinable. For example, with a four (4) Mc part, one (1) $\mu$s machine cycle, and ten (10) kc PWM, a period of approximately one hundred (100) $\mu$s is achieved. Since three (3) machine cycles equals approximately three (3) $\mu$s, the resolution of the PWM is one hundred (100) $\mu$s divided by three (3) $\mu$s or one (1) part in thirty-three (33) or three (3%) percent. While this can be considered too coarse for some control applications, in the present case, the exemplar twenty (20) pulse group can be divided into the three sub-groups, as described above (the first sub-group having five (5) pulses, the second sub-group having ten (10) pulses, and the third sub-group having five (5) pulses.

In the immediately preceding example, the application has one (1) part in thirty-three (33) resolution. Such resolution would accept PWM values from the main body of the code of approximately 0$\leq$value $\leq 2^5$ (32).

If it is assumed that the application should have less than one (1%) percent resolution and the ability to pass numbers 0$\leq$value $\leq 2^7$ (128), the last two bits of the number is used as flags for the first sub-group pulses and the second sub-group pulses, leaving the upper five (5) bits to be used as the "on" count. For purposes of this example, the shift in percentage due to the main body of the code run time will be ignored.

EXAMPLE 1

10 (H) or 10000 is 16 decimal and would produce 20*(16×3)/100×20 or 40% duty cycle.

11 (H) or 10000 is 17 decimal and would produce 20*(17×3)/100×20 or 51% duty cycle.

If a seven (7) bit number for each increment is used, it will produce a smaller change in the PWM percentage, i.e., 41 (H) or 1000001. The upper five (5) bits are used for the on-time yielding, i.e., 16/33×100 or 48% duty cycle. However, now the lower bits are used to set flags for the first sub-group pulses and the second sub-group pulses. In this example, the first sub-group pulses are set to add one bit of on-time and the second sub-group pulses is to not add one bit of on-time. The pulse sub-groups then look like:

First sub-group 5 pulses of 17×3 $\mu$s;

Second sub-group 10 pulses of 16×3 $\mu$s; and

Third sub-group 5 pulses of 16×3 $\mu$s.

$$\text{Total duty cycle} = \frac{5*(17\times3)+10*(17\times3)+5*(16\times3)}{20\times100}$$

$$= (975 \ \mu\text{s on-time}/2000 \ \mu\text{s off-time})\times100 = 48.75\%.$$

Therefore, with a one (1) bit increment in the PWM value, the PWM percentage increased from 48.5% to 48.75%.

Now, with 42 (H) or 1000010, the first sub-group pulses are not set to add one bit of on-time and the second sub-group pulses are set to add one bit of on-time:

$$\text{Total duty cycle} = \frac{5*(16\times3)+10*(17\times3)+5*(16\times3)}{20\times100}$$

$$= (990 \ \mu\text{s on-time}/2000 \ \mu\text{s off-time})\times100 = 50.25\%.$$

Now, with 43 (H) or 1000011:

$$\text{Total duty cycle} = \frac{5*(17\times3)+10*(17\times3)+5*(16\times3)}{20\times100}$$

$$= (1005 \ \mu\text{s on-time}/2000 \ \mu\text{s off-time})\times100 = 50.25\%.$$

Finally, with 44 (H) or 1000100:

$$\text{Total duty cycle} = \frac{5*(17\times3)+10*(17\times3)+5*(17\times3)}{20\times100}$$

$$= (1020 \ \mu\text{s on-time}/2000 \ \mu\text{s off-time})\times100 = 51\%.$$

Therefore, it is possible to increment the on-time average in 0.75% steps thereby providing a resolution of 4× greater for any given microprocessor machine cycle rate. It is within the scope of the present invention to use the above process with more than the three sub-groups to further increase the resolution. However, the associated over-head will tend to cause non-linearity which becomes more noticeable with more sub-groups. Furthermore, it should be noted that the third sub-group pulses are never incremented, but rather are a fixed spacer.

The powerful advantage of the motor control 10 of the present invention is that the motor control 10 allows the use of very low cost microcontrollers. The microcontrollers do not need to have any dedicated PWM output registers to be used in this motor control 10 of the present invention.

Inferred Over-temperature Protection:

Another benefit of having the motor current information available to the microcontroller is the ability of the microcontroller to calculate and keep track of the heat which has been delivered to the motor. By integrating the measured current signal squared over time, the microcontroller can maintain an understanding of the amount of accumulated heat in the motor controller and the motor. This can be used to provide an over-temperature protection without requiring any additional components such as thermistors and their associated conditioning circuitry.

Conclusions:

The motor control of the present invention allows the production of very low parts-count motor controllers with a great deal of functionality. The motor control also facilitates the embodiment of several important safety features into the hardware and software of the motor controller. These safety features can be of critical importance if the motor controller is driving (as is typical) high torque motors. A failure of the motor controller which goes undetected can destroy the equipment in which it is installed and injure operators.

Allowing all of this performance and safety while at the same time reducing parts count and cost makes this microcontroller-based motor control of the present invention both safe and economical. The motor control can be produced for less than the comparably rated existing drives while offering the same performance and improved safety. The actual feel of the motor controller can be tailored to the particular needs of a customer in software allowing many versions of the same hardware to serve many diverse applications.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

I claim:

1. A motor control apparatus for controlling a D.C. motor, the apparatus comprising:

means for controlling a D.C. motor utilizing a microcontroller, the means being substantially free from analog circuitry;

wherein the means performs I.R. compensation with software, the means being free from resistors, capacitors, and op-amp summer circuits necessary to perform an analog circuit.

2. A motor control apparatus for controlling a D.C. motor, the apparatus comprising:

means for controlling a D.C. motor utilizing a microcontroller, the means being substantially free from analog circuitry;

wherein the means includes inferring temperature measurement of the motor, the means being free from temperature sensor, buffering circuitry, and circuitry necessary to implement a fold-back function in an analog circuit.

3. A motor control apparatus for controlling a D.C. motor, the apparatus comprising:

means for controlling a D.C. motor utilizing a microcontroller, the means being substantially free from analog circuitry;

a plurality of pulse groups, each pulse group having a plurality of pulses;

wherein at a predetermined point in time after a final pulse of a final pulse group where the current has settled down and is noise free, the means synchronously detects the current waveform only at the predetermined point in time where switching transients have disappeared and the value will be valid and noise-free allowing the means to be substantially free from filtering in an analog circuit.

4. A motor control apparatus for controlling a motor, the motor having a high voltage rail, the high voltage rail having a predetermined voltage, the apparatus comprising:

a microprocessor comprising:
     means for producing a PWM signal; and
     means for operating low-voltage relays from the high voltage rail utilizing the PWM signal to reduce the average voltage to the relay coil.

5. A motor control apparatus for controlling a motor, the motor having an output power stage and a relay allowing power to be connected to the output power stage, the apparatus comprising:

a microprocessor providing a PWM cycle delivered to an output transistor, the microprocessor activating the transistor for a first predetermined amount of time during the PWM cycle causing the output power stage to drive the motor; and detection means within circuitry of the microprocessor for detecting a fault in the output transistor, the circuitry disengaging the relay, thereby removing power from the output power stage and causing the motor to cease being driven.

6. The apparatus of claim 5 wherein the detection means disengages the power from the output power stage by means of the relay in approximately ten (10) $\mu$s.

7. A motor control system for controlling a motor, the motor having internal resistive losses of current during operation of the motor, the system comprising:

a microcontroller, the microcontroller comprising:
     monitoring and detecting means for monitoring the current of the motor and detecting internal resistive losses of current of the motor; and
     means for adding a proportion amount of pulse width to the motor current upon detection of internal resistive losses of current by the monitoring and detecting means.

8. The system of claim 7 wherein the monitoring and detecting means utilizes a synchronous detecting A/D circuit.

9. The system of claim 7 and further comprising A/D means for sampling the discontinuous current waveform synchronously with the microcontroller to increase the accuracy of the measured motor current.

10. A motor control apparatus for controlling a motor, the motor having a predetermined operating system temperature, the apparatus comprising:

a microcontroller means within the microcontroller for inferring the system temperature and protecting against overload by integrating the measured current over time wherein upon the means determining that the inferred system temperature is greater than the predetermined operating system temperature, the microcontroller ceasing operation of the motor.

* * * * *